March 10, 1953     S. M. CHRISTIAN     2,631,246
RADIATION DETECTION
Filed Feb. 28, 1950
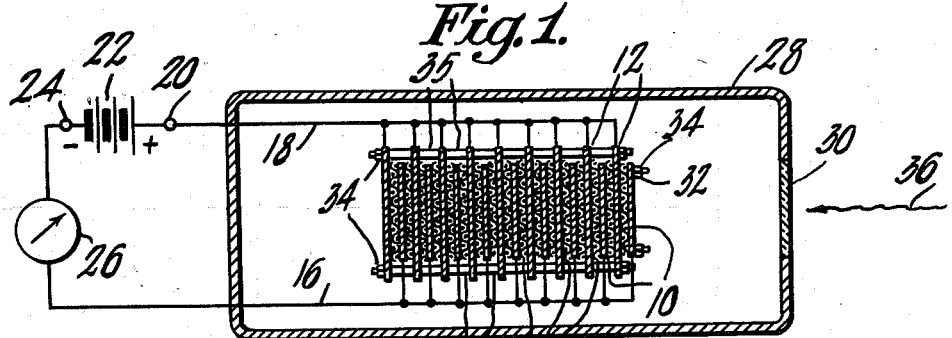
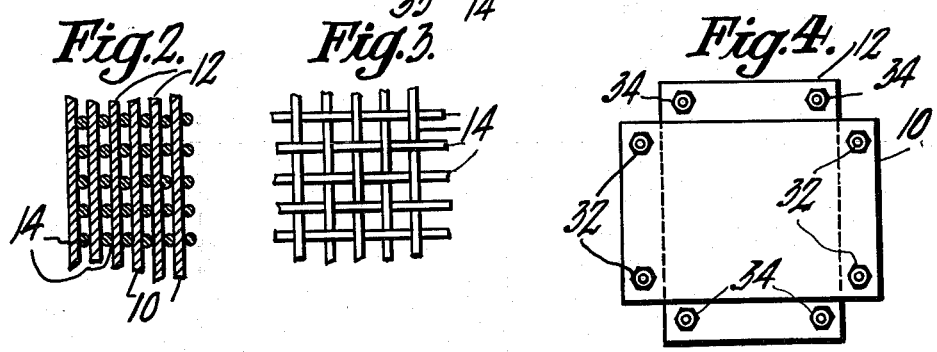
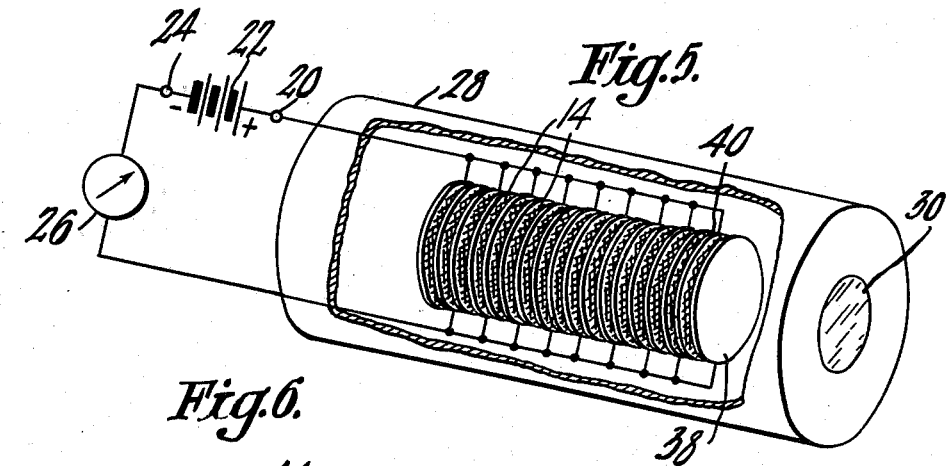
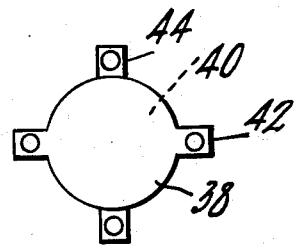
INVENTOR
Schuyler M. Christian
BY J. L. Whittaker
ATTORNEY Patented Mar. 10, 1953

2,631,246

UNITED STATES PATENT OFFICE 2,631,246

RADIATION DETECTION

Schuyler M. Christian, Princeton, N. J., assignor to Radio Corporation of America, a corporation of Delaware Application February 28, 1950, Serial No. 146,730

15 Claims. (Cl. 250—83.6)

1

This invention is related to radiation detection devices.

In the detection of various types of radiation, particularly the so-called "hard" radiation such as gamma rays, it has been the custom to use Geiger-Mueller counters. These counters usually comprise a central wire-like anode, a cylindrical cathode around and spaced from the anode, and an ionizable gas, all enclosed within a partially evacuated envelope. The field stresses are such that the ionization of one of the gas particles as a result of impingement of radiation causes an avalanche of ionized particles. A momentary current results which is readily detected and is an indication of the presence of the radiation. Many forms of the Geiger-Mueller counter are known. However, this type of instrument, although permitting the separate count of almost every radiation ray which causes ionization in the counter has a serious defect. Comparatively high energy, "hard" radiation may pass entirely through the counter without resultant ionization of any particle therein. Scintillation counters are also known, in which a solid crystal emits light in response to radiation. A phototube counter is employed to count the pulses or quanta of emitted light. Following the teachings of the invention, devices for the detection of hard radiation may be made at least several times more sensitive than Geiger-Mueller type counters. The material which is to absorb the radiation and emit a charged particle in the radiation detection device of the invention has a much greater density than in the Geiger-Mueller counter. Devices according to the invention are simpler, more rugged, and less expensive than the scintillation counter.

Among the objects of the invention are to provide a novel radiation detection device and to provide a novel radiation detection meter.

It is another object of the invention to provide a radiation detection device more compact than prior devices.

Still another object of the invention is to provide a more sensitive radiation detection device which produces more current per unit volume of the device in response to radiation, and particularly hard radiation, than prior art devices.

A still further object of the invention is to provide a readily constructed rugged radiation detection device.

These and other objects, advantages, and novel features of the invention will be more apparent from the following description when taken in connection with the accompanying drawing in

2 which like reference numerals refer to like parts and in which:

Fig. 1 is a partially schematic elevational cross-sectional view of a novel radiation detection meter according to a first embodiment of the invention, and employing in a novel detection device planar metallic electrodes interleaved and with insulating threads between them;

Fig. 2 is a similar enlarged fragmentary cross-sectional view illustrating in greater detail the assembly of the planar plates of Fig. 1 and the insulation between them;

Fig. 3 is a face view of the insulation illustrated cross-sectionally in Fig. 2;

Fig. 4 is an end view of the electrode assembly of the device of Fig. 1;

Fig. 5 is a schematic perspective view of another embodiment of the invention in which a dished nested assembly of electrodes is employed in the radiation detection device; and Fig. 6 is a face view of the assembled electrodes of the embodiment of Fig. 5.

It has been discovered that the sensitivity of radiation detection devices, particularly those for hard radiation, may be markedly increased by increasing the density of radiation absorbing material within the device. In prior art devices of the Geiger-Mueller type, it is common for the space in which the radiation is to be absorbed to be sparsely filled with radiation absorbent material. The scintillation counter increases the density of absorber material and may have a greater efficiency than Geiger-Mueller type counters. However, the crystal of the scintillation counter is liable to deteriorate, as by absorption of moisture. This crystal is of high cost because it must be extremely pure. The requirement for a photo-tube amplifier also complicates the construction. In accordance with the invention, the space in which the radiation is to be absorbed is compactly and densely filled with radiation absorbent material. There are employed a plurality of metallic cathode members and a plurality of metallic anode members. These are arranged closely to each other by placing between each anode and cathode member perforate mesh dielectric spacers so that the assembly is one of closely compact layers. The anode and cathode plates are selected of different metals according to their electron-emitting characteristics. The cathode plates should have high electron emission in response to hard radiation. In general metals high in atomic weight are selected for the cathode plates. For the anode plates metals of low atomic weight are selected. An atomic weight of 50 is here taken as the dividing weight between metals of low and high atomic weight. Copper is a preferred example of a high atomic weight metal. Gold or tungsten are also good, though expensive.

The radiation entering the space thus densely filled, even though it may be of the hard type, is more certain to be absorbed before its passage through the almost filled space than in the Geiger-Mueller type counter. Upon absorption, an electron is released which passes through the apertures of the perforated dielectric from the cathode to the anode members. The resultant current flow may be utilized to provide an indication of the presence of the radiation. It is not particularly an object of the present device or instrument to record separately each and every such absorption of radiation distinctly from each other, but rather to obtain the greatest amount of current indication possible for the average amount of radiation entering the device. Accordingly, although it may not be possible in some instances to indicate a single discrete quantum of radiation by the device, a more sensitive average count is secured by a more compact and a more rugged device than those in prior use.

Referring now more particularly to Fig. 1, a plurality of imperforate planar metallic cathodes 10 are arranged parallel to each other with a plurality of imperforate planar metallic anodes 12 interleaved between them. Between each cathode plate 10 and the adjacent anode plate 12 is mesh dielectric material 14 perforated or foraminous to be electron permeable through the perforations. All of the cathodes 10 are directly connected together by suitable connection 16. Similarly all of the anodes 12 are suitably directly connected by connection 18. The positive terminal 20 of a battery 22 or other source of unidirectional voltage is connected to the common anode connection 18. The negative terminal 24 of the battery 22 is connected through a sensitive meter 26 to the common cathode connection 16. Thus the voltage source and meter are connected in series between the anode and cathode plates. The assembly of cathode plates 10, anode plates 12, and dielectric 14 may be enclosed for protection, if desired, in a suitable envelope 28 which is preferably only partially evacuated. A window 30 may be provided in envelope 28 which is more permeable to the radiation to be detected than the remainder of the envelope wall. Since the incident energy to be detected is restricted by the use of the window, the direction of the radiation source may be readily determined.

The compact assembly of electrodes and spacing by the dielectric is best understood by reference to Fig. 2. Each plate 10 is parallel to an adjacent plate 12 and separated therefrom by dielectric thread 14, for example, of polystyrene, preferably woven as in Fig. 3. Thus the dielectric separating members have transverse apertures or perforations. The entire assembly is tightly compressed together by an arrangement such as that shown in face view in Fig. 4. The plates 10 and 12 preferably are rectangular in shape. Plates 10 overlap in this view the edges of the plates 12. Screws or nuts 32 and 34 are respectively inserted through the plates 10 and 12 to compress and hold the plates together. If desired, washers 35 (see Fig. 1) may be inserted between each plate over the screws to prevent buckling or warping of the plates. The screws 32 and 34 may also serve respectively as the common connections 16 and 18. The metallic plates 10 are preferably a metal which produces a high ratio of emitted electrons for absorbed radiation compared to other metals. The anode plates 12 may be any metal of good conductivity which preferably produces a comparatively low ratio of emitted electrons for absorbed radiation. The use of the dielectric woven threads as spacers permits closer spacing of the electrodes to provide more dense and compact structure.

In operation radiation represented by the arrow 36 incident normal to the plane of the plates 10, 12 striking the assembly of plates may or may not be absorbed by the first of the plates 10, 12 which it strikes. The radiation will very probably be absorbed by subsequent plates, depending on the energy of the radiation and thickness of the assembled plates. For example, if there are six or eight inches of these plates each of thickness of .005 of an inch assembled in interleaved layers, with the separation by the threads 14 of about .002 or .003 of an inch, absorption of soft X-rays is of the order of 90%. About 50% of ordinary gamma radiation are absorbed by the device with the suggested dimensions.

If the radiation 36 is absorbed by one of the anode plates 12 and causes emission therefrom of an electron, no current will be indicated, because the remaining positive charge on the plate 12 is cancelled by the return of the electron due to the electro-motive force of the battery. However, if an electron is emitted from one of the cathode plates 10 in the transverse apertures or perforations between the threads 14, it passes immediately to one of the anode plates 12 and a resultant current is detected by the meter 26. A similar current arises from positive particles emitted by the plates 12.

There is a considerable capacitance between the various plates 10, 12. It is true that this large capacitance tends to prevent the detection of single quanta of absorbed radiation. However, devices according to the invention are several times more sensitive to radiation than prior art devices of similar size and operating voltage rating. For example, where .1 milliampere is detected by a prior art device of like size and having a like battery, the device of the invention will provide a response of greater than .6 milliampere. One of the advantages of the high capacitance is that fluctuations in readings due to background count and statistical variation of prior instruments are integrated in an arrangement according to the invention. This provides easier and simpler reading of average response values, permitting use of a sensitive meter 26 with relatively low damping characteristics. Minor variation in the number of absorbed radiation units per second are effectively smoothed out. The higher sensitivity of the device provides more accurate average current indications.

The embodiment of the invention shown in Fig. 5 is similar to that of Fig. 1 except that the cathode plates 38 and anode plates 40 are curved similarly to each other, and are dished and alternately nested or interleaved together. They are illustrated as substantially circular, but may be any other convenient shape. A perforate dielectric 14, which may be the same as the woven dielectric of Fig. 3, is disposed between and in physical contact with the plates 38 and 40.

The operation of the device will be the same as for the device of Fig. 1 but sensitivity will be greater due to greater plate surface per unit cross-sectional area subjected to irradiation.

The assembly of the curved plates may be such as illustrated in Fig. 6 with tabs 42, 44 extending from the edges of the cathode and anode plates 38, 40 respectively through which suitable screws may be extended to compress the assembly and connect together respectively the cathode or anode plates as described heretofore.

In view of the foregoing it will be apparent that the invention includes a radiation detection instrument which is more compact, more rugged, and more sensitive per unit volume to average radiation than prior art devices, and which is readily and easily constructed. The devices according to the invention include a plurality of nested cathode and anode electrodes separated by perforate dielectric spacers. The anode and cathode electrodes are respectively connected together and connected in series with a power source and a sensitive D.-C. meter.

What is claimed is:

1. A radiation detection device comprising a plurality of anode members of a metal of atomic weight less than fifty, a plurality of cathode members of a metal of atomic weight greater than fifty, and a plurality of multiply perforate mesh dielectric spacer members, said members being assembled in parallel layers with a spacer in physical contact and between each anode and cathode member, said anode and cathode members being respectively electrically directly connected together.

2. The device claimed in claim 1, the perforations of each said spacer being transverse, for free electron passage between the cathode and anode between which said spacer is assembled.

3. A radiation detection device comprising a plurality anode plates of low atomic weight metal, a plurality of cathode plates of high atomic weight metal, and a plurality of multiply perforate mesh delectric spacer members, said cathode and anode plates being assembled in interleaved parallel layers with a perforate spacer in physical contact and between each anode and cathode member, the perforations of each said spacer being positioned for free electron passage between the cathode and anode between which each said spacer is assembled.

4. A radiation detection device comprising several anode plates of low atomic weight metal, a plurality of cathode plates of high atomic weight metal, said anode and cathode plates having imperforate portions and a plurality of multiply perforate mesh dielectric spacer members, said plates being assembled with the anode and cathode members in parallel layers interleaved with each other and with a spacer member in physical contact and between each anode and cathode member, the perforations of each said spacer being positioned between said imperforate portions of said anode and cathode members to permit the free passage of charged particles therebetween.

5. The device claimed in claim 1, said anode and cathode plates being planar.

6. The device claimed in claim 1, said anode and cathode plates being dished.

7. The device claimed in claim 3, said dielectric spacers comprising dielectric threads.

8. The device claimed in claim 3, said dielectric spacers comprising woven dielectric threads.

9. The device claimed in claim 1, said device further comprising an envelope enclosing said members assembled, and leads therethrough for electrical connection respectively to said anode and cathode members.

10. The device claimed in claim 4, said dielectric spacers comprising dielectric thread.

11. The device claimed in claim 4, said dielectric spacers comprising woven dielectric thread.

12. The device claimed in claim 4, said plates being planar.

13. The device claimed in claim 4, said plates being dished and nested in their assembly.

14. A radiation detection meter comprising a device comprising a plurality of anode plates of low atomic weight metal, a plurality of cathode plates of high atomic weight metal, said anode and cathode plates having imperforate portions, and a plurality of dielectric mesh spacers, said plates being assembled with the anode and cathode members in parallel layers interleaved with each other and with a spacer in physical contact and between each anode and cathode member, the mesh perforations of each of said spacer being positioned between said imperforate portions of said anode and cathode members to permit the free passage of charged particles therebetween, and a source of unidirectional voltage and a meter connected in series between said anode and cathode plates.

15. The meter claimed in claim 14, further comprising a non-evacuated envelope enclosing said device.

SCHUYLER M. CHRISTIAN.

REFERENCES CITED

The following references are of record in the file of this patent:

UNITED STATES PATENTS

| Number | Name | Date |
| --- | --- | --- |
| 1,839,899 | Slepian | Jan. 5, 1932 |
| 2,397,073 | Hare et al. | Mar. 19, 1946 |
| 2,397,074 | Hare et al. | Mar. 19, 1946 |

OTHER REFERENCES

Rev. of Sci. Instruments, Evans et al., Dec. 1936, vol 7. pgs. 441–449.